(12) United States Patent
Nakano et al.

(10) Patent No.: US 9,324,019 B2
(45) Date of Patent: Apr. 26, 2016

(54) IC TAG

(71) Applicant: NOK CORPORATION, Tokyo (JP)

(72) Inventors: Tomoko Nakano, Fujisawa (JP); Keiichi Miyajima, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/377,420

(22) PCT Filed: Jan. 25, 2013

(86) PCT No.: PCT/JP2013/051591
§ 371 (c)(1),
(2) Date: Aug. 7, 2014

(87) PCT Pub. No.: WO2013/118591
PCT Pub. Date: Aug. 15, 2013

(65) Prior Publication Data
US 2015/0294211 A1 Oct. 15, 2015

(30) Foreign Application Priority Data
Feb. 9, 2012 (JP) ................. 2012-025888

(51) Int. Cl.
G06K 19/077 (2006.01)
G06K 19/02 (2006.01)

(52) U.S. Cl.
CPC .......... *G06K 19/0775* (2013.01); *G06K 19/027* (2013.01); *G06K 19/0772* (2013.01); *G06K 19/07728* (2013.01)

(58) Field of Classification Search
CPC ............................................. G06K 17/06046
USPC ......................................................... 235/492
See application file for complete search history.

(56) References Cited

U.S. PATENT DOCUMENTS

2010/0123011 A1* 5/2010 Baba et al. .................. 235/492
2010/0258640 A1 10/2010 Takeuchi et al.

FOREIGN PATENT DOCUMENTS

| JP | 06270579 A | * | 9/1997 |
| JP | 2003-187201 A | | 7/2003 |
| JP | 2005010927 A | | 1/2005 |
| JP | 2007310472 A | | 11/2007 |
| JP | 2009054088 A | | 3/2009 |
| JP | 2010250504 A | | 11/2010 |
| JP | 2011221598 A | | 11/2011 |
| WO | 2012/005101 A1 | | 1/2012 |

OTHER PUBLICATIONS

Extended European search report dated Aug. 25, 2015.

* cited by examiner

*Primary Examiner* — Allyson Trail
(74) *Attorney, Agent, or Firm* — Harness, Dickey & Pierce, P.L.C.

(57) ABSTRACT

There is provided an IC tag that is simple in structure and in which concentration of stress in a portion near the connection of an IC chip and an antenna part can be reduced. The IC tag 100 includes a film member 10, an antenna part 20 provided on the film member 10, an IC chip 30 mounted on the film member 10 in such a way as to be connected with the antenna part 20. A slit 51 is provided at a position away from the antenna part 20 in the region on the film member 10 near the site at which the IC chip 30 is mounted, and a covering 41 made of an elastic material is provided to cover at least the entire area of the IC chip 30 and a portion of connection of the IC chip 30 and the antenna part 20.

2 Claims, 4 Drawing Sheets

IC TAG

CROSS-REFERENCE TO RELATED APPLICATIONS

This application is a National Stage of International Application No. PCT/JP2013/051591, filed Jan. 25, 2013, which claims priority to Japanese Patent Application No. 2012/025888, filed Feb. 9, 2012. The entire disclosures of each of the above applications are incorporated herein by reference.

FIELD

The present disclosure relates to an IC tag used in RFID.

BACKGROUND

Hither-to, the RFID technology has been widely used for the purpose of product management. In a case where IC tags are attached to linen goods such as uniforms or bed sheets used in a hotel, the IC tags will be washed with the linen goods in the laundry. Therefore, the IC tags attached to such goods need to have strength against external forces and resistance against solutions used in the laundry process. A known IC tag to be attached to linen goods is provided with a covering made of a rubber material to cover the body of the IC tag.

However, in the dewatering step of the laundry process, strong bending and twisting forces and a pushing load act on the above-described IC tag, possibly causing breakage in the vicinity of the connection of an IC chip and an antenna part. Such a situation will be described with reference to FIG. 6. FIG. 6 is a plan view of an IC tag according to a prior art. In FIG. 6, the covering is not illustrated.

As shown in FIG. 6, the IC tag 200 includes a film member 210, an antenna part 220 provided in the film member 210, and an IC chip 230 mounted on the film member 210 and connected to the antenna part 220. While the thickness of the antenna part 220 is thin, the IC chip 230 has a large thickness. Specifically, while the antenna part 220 is made of a thin film such as a copper foil, which is very thin, the IC chip 230 has a thickness of approximately 0.5 millimeter. Therefore, when bending and/or twisting force acts on the IC tag 200, stress will concentrate at a portion in the vicinity of the connection of the antenna part 220 and the IC chip 230 (i.e. the region indicated by X in FIG. 6). Consequently, breakage can occur in the vicinity of the connection.

As countermeasures against breakage caused by concentration of stress, a technique of providing slits in the film member on both sides of the IC chip (Patent Document 1) and technique of reinforcing the connection of the IC chip and the antenna part using a reinforcing plate or the like to reduce the effect of bending stress (Patent Document 2) have been known. However, the former technique is unsatisfactory as means for protecting the portion near of the connection of the IC chip and the antenna part in cases where a pushing load acts, as is the case in the above-described dewatering process. On the other hand, the latter technique leads to the problem of complex structure. Therefore, there is yet room for improvement.

PRIOR ART DOCUMENTS

Patent Documents

Patent Document 1: Japanese Patent Application Laid-Open No. 2011-221598

Patent Document 2: Japanese Patent Application Laid-Open No. 2010-250504

SUMMARY

Problems to be Solved by the Disclosure

An object of the present disclosure is to provide an IC tag that is simple in structure and in which concentration of stress in a portion near the connection of the IC chip and the antenna part can be reduced.

To solve the above problems, the following means is adopted in the present disclosure.

An IC tag according to the present disclosure includes: a film member; an antenna part provided on said film member; and an IC chip mounted on said film member in such a way as to be connected with the antenna part, wherein a slit is provided at a position away from the antenna part in a region on said film member near the site at which the IC chip is mounted, and a covering made of an elastic material is provided to cover at least the entire area of said IC chip and a portion of connection of said IC chip and said antenna part.

According to the present disclosure, a slit is provided near the site at which the IC chip is mounted. Therefore, when a pushing load acts on the IC tag (namely, when a force acts on the IC tag in its normal direction), a portion near the site at which the IC chip is mounted can deform. Consequently, stress in the region near the mount site can be relaxed. Moreover, the covering made of an elastic material protects the IC chip and covers the portion of connection of the IC chip and the antenna part. Therefore, the portion near the connection of them is reinforced, and bending and twisting of the portion near the connection can be avoided to some extent, whereby concentration of stress can be reduced. Thus, the stress relaxation by the slits in the portion near the site at which the IC chip is mounted and the stress relaxation by the covering in the portion of connection of the IC chip and the antenna part are combined to effectively reduce concentration of stress in the portion of connection of the IC chip and the antenna part.

Advantageous Effect of the Disclosure

As described above, according to the present disclosure, concentration of stress in a portion near the connection of the IC chip and the antenna part can be reduced with a simple structure.

DRAWINGS

Figure 4:
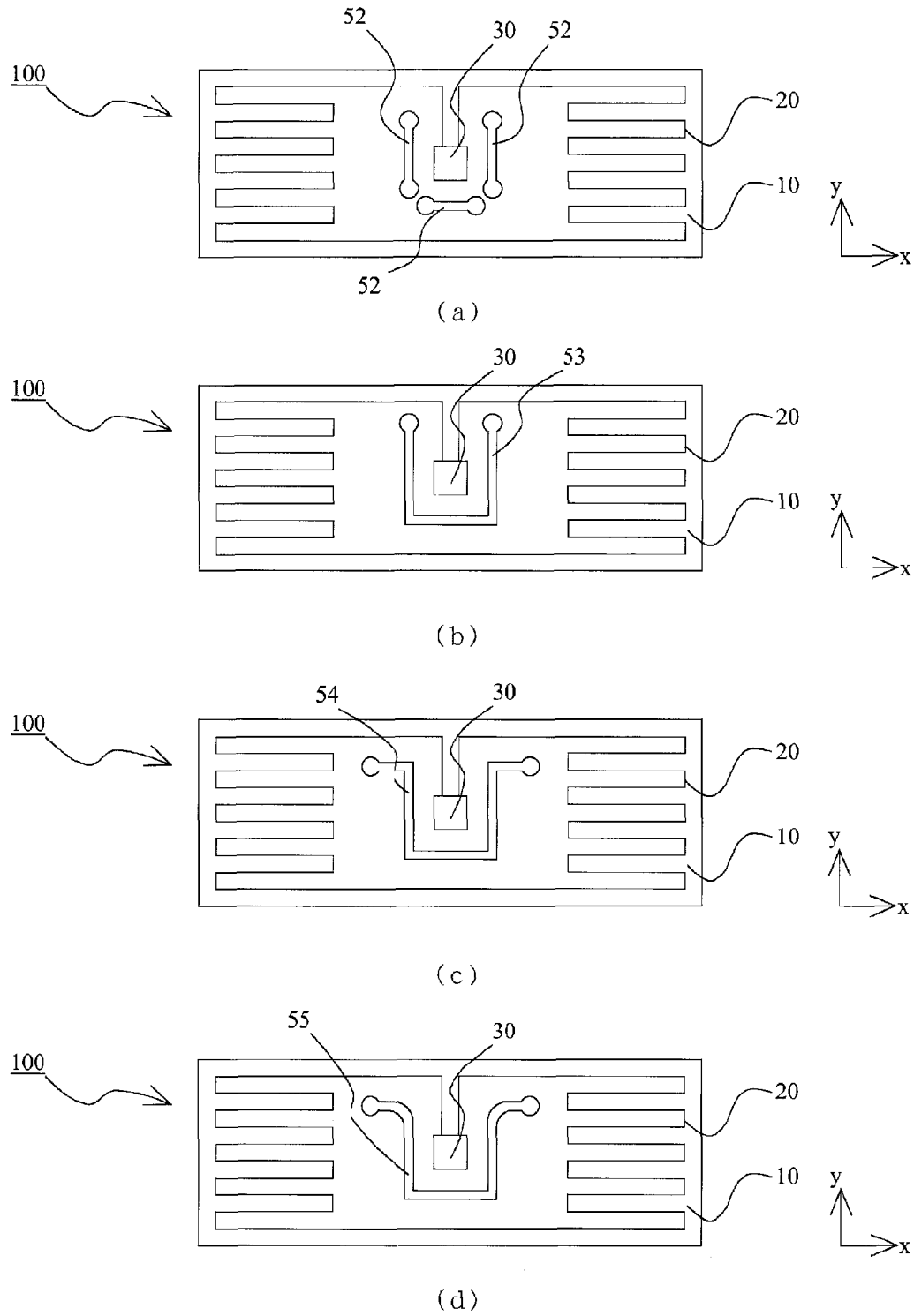

FIG. 4 includes plan views of exemplary slit arrangement patterns in the IC tags according to embodiments of the present disclosure.

Figure 5:
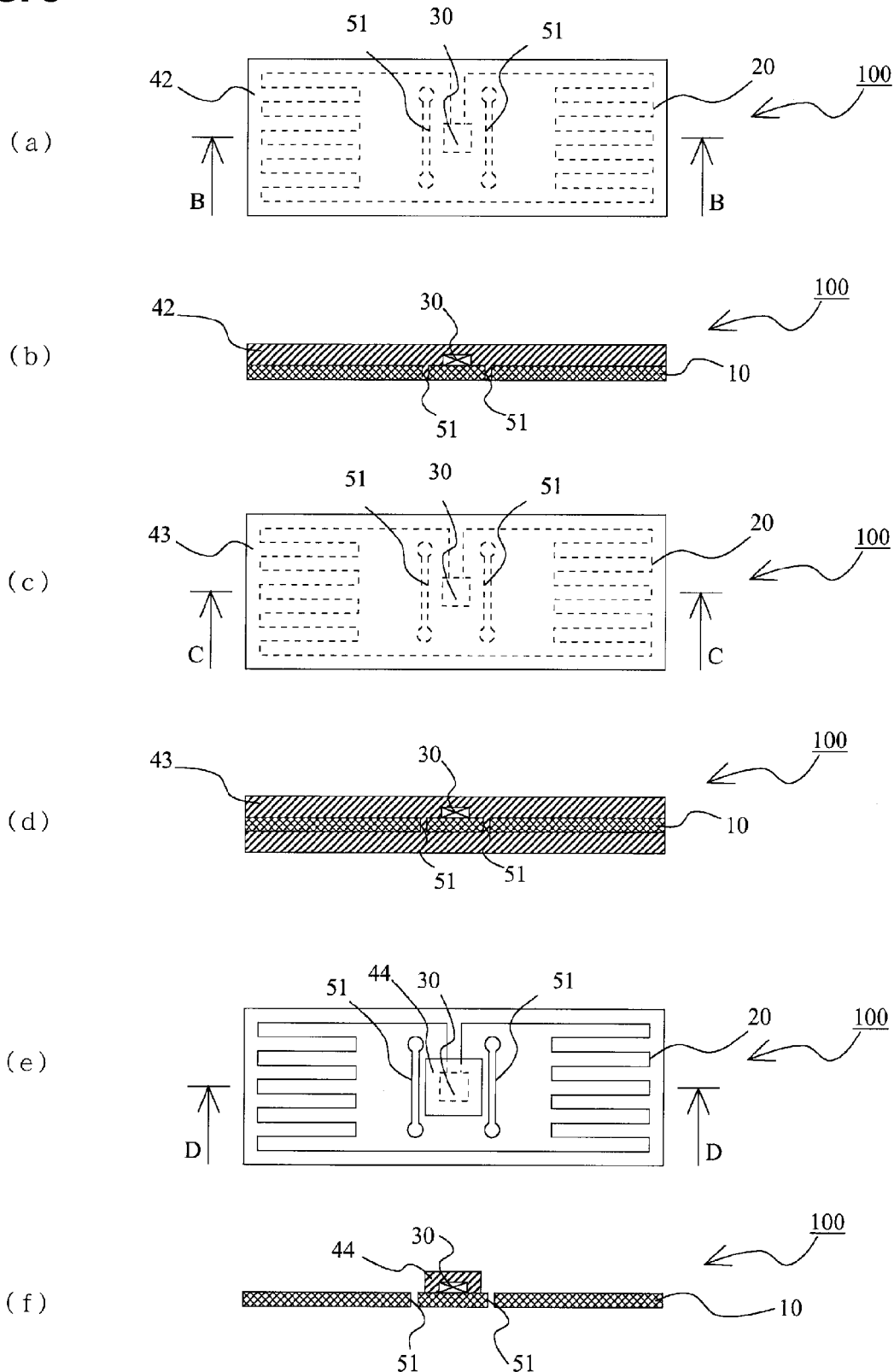

FIG. 5 shows exemplary patterns of arrangement of a covering in IC tags according to embodiments of the present disclosure.

Figure 6:
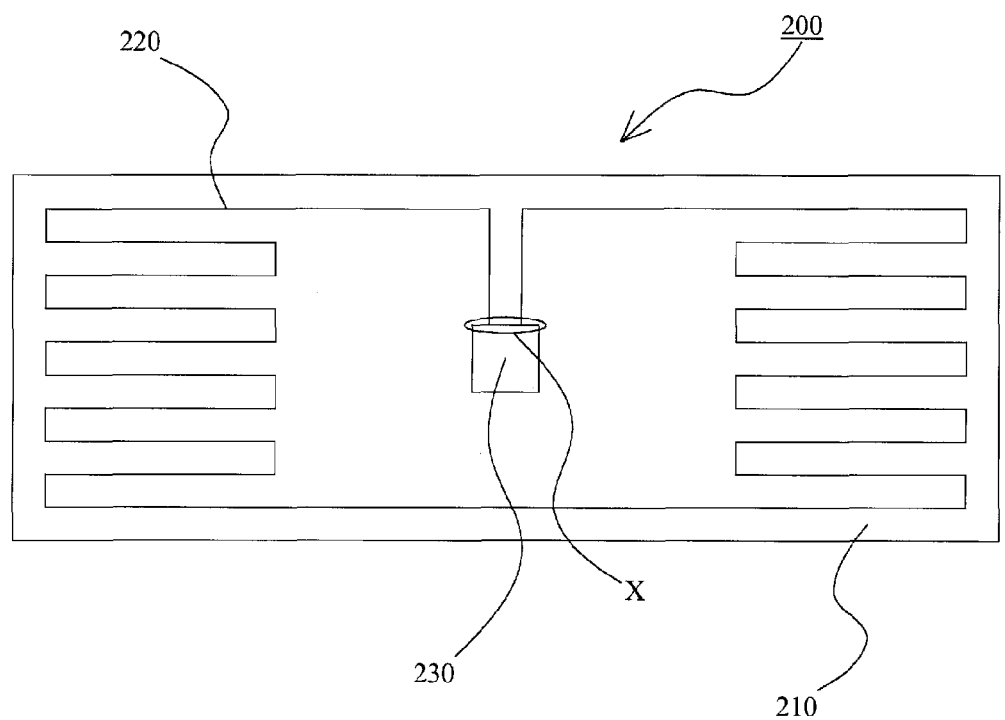

FIG. 6 is a plan view of an IC tag according to a prior art.

DETAILED DESCRIPTION

In the following, embodiments for carrying out the present disclosure will be described in detail by way of example with reference to the drawings. The dimensions, materials, shapes, relative arrangements, and other features of the components that will be described in connection with the embodiments are not intended to limit the technical scope of the present disclosure only to them, unless particularly stated.

Embodiment

Figure 1:
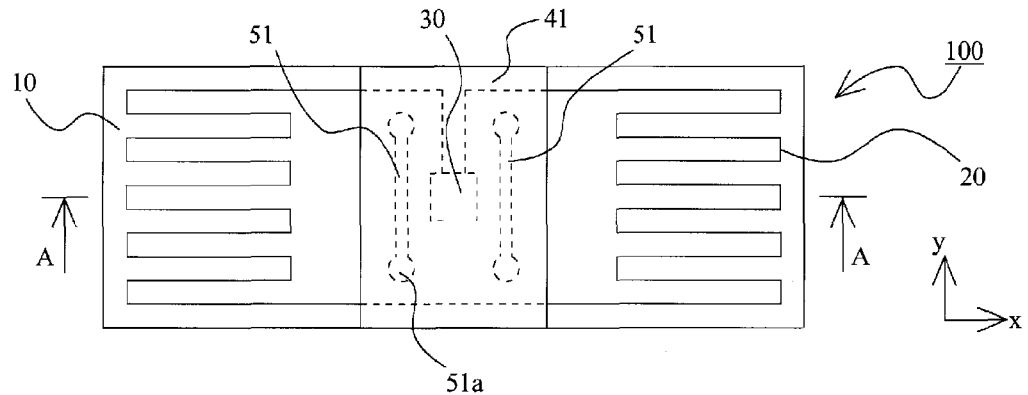
FIG. 1 is a plan view of an IC tag according to an embodiment of the present disclosure.
Figure 2:
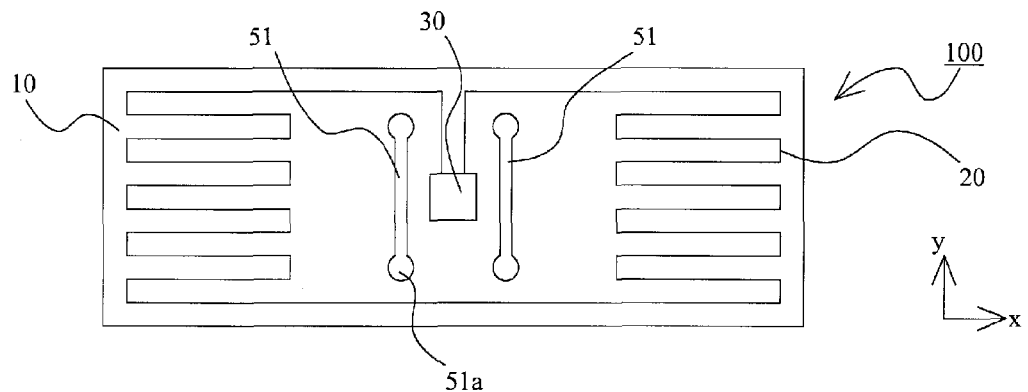
FIG. 2 is a plan view of the IC tag according to the embodiment of the present disclosure, showing its state before molding of a covering.
Figure 3:
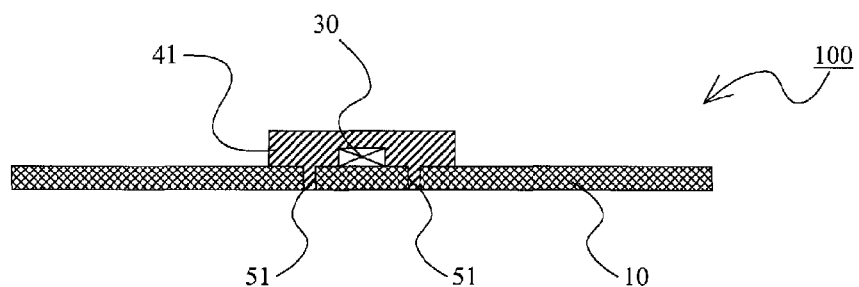
FIG. 3 is a schematic cross sectional view of the IC tag according to the embodiment of the present disclosure.

An IC tag according to an embodiment of the present disclosure will be described with reference to FIGS. 1 to 3. The IC tag according to the present disclosure is used in RFID and suitably used, in particular, as an IC tag to be attached to linen goods. FIG. 1 is a plan view of the IC tag according to the embodiment of the present disclosure. FIG. 2 is a plan view of the IC tag according to the embodiment of the present disclosure, showing its state before molding of a covering. FIG. 3 is a schematic cross sectional view of the IC tag according to the embodiment of the present disclosure. FIG. 3 is a cross sectional view taken along line A-A of FIG. 1.

<Construction of the IC Tag>

The IC tag 100 includes a film member 10 such as a resin film, an antenna part 20 provided on the film member 10, and an IC chip 30 mounted on the film member 10 and connected to the antenna part 20.

Examples of the material of the film member 10 include polyethylene terephthalate, polyethylene naphthalate, and polyimide. The antenna part 20 can be provided on the film member 10 using a typical technique for making an FPC (flexible printed circuit). Because this technique is already known, it will not be described in detail. For example, the antenna part 20 can be formed by etching a copper foil on a resin film or by screen printing on a resin film. After the antenna part 20 is formed, the IC chip 30 is mounted. The film member 10 is composed of a base film and a cover film that are laminated together, and the antenna part 20 is provided between the base film and the cover film.

In this embodiment, the film member 10 has slits 51 provided at positions away from the antenna part 20 in the region near the site at which the IC chip 30 is mounted. In the illustrated case, the slits 51 are provided at two positions on both sides of the IC chip 30. At both ends of the slits 51, there are circular holes 51a in order to prevent a rent from developing therefrom. The slits 51 can be formed by cutting the base film and the cover film beforehand by, for example, pre-punching. IC tags 100 are separated one by one by punching a large sheet on which various processings including the formation of antenna parts 20 have been performed. The slits 51 may be formed in this punching process (see Japanese Patent Application Laid-Open No. 2011-180935).

In this embodiment, there is provided a covering 41 made of an elastic material that covers at least the entire area of the IC chip 30 and the portion connecting the IC chip 30 and the antenna part 20. More specifically, the covering 41 is provided on one side of the film member 10 in such a way as to cover the entire area of the IC chip 30, the portion of the antenna part 20 that is not distant from the IC chip 30, and the slits 51.

The covering 41 can be formed by insert molding with the film member 10 provided with the antenna part 20 and the IC chip 30 being the insert part. Specific examples of the molding material include silicone rubber, fluororubber, nitrile rubber, butyl rubber, and EPDM.

Advantages of the IC Tag According to the Embodiment

The IC tag 100 according to the embodiment has slits 51 provided in the region near the site at which the IC chip 30 is mounted. With this feature, when a pushing load acts on the IC tag 100, a portion near the site at which the IC chip 30 is mounted will deform. This can relax the stress in the portion near the mount site. Consequently, breakage in the portion near the site at which the IC chip 30 is mounted can be prevented from occurring.

In the IC tag 100 according to the embodiment, the covering 41 made of an elastic material is adapted to protect the IC chip 30 and to cover the portion of connection of the IC chip 30 and the antenna part 20. Therefore, the portion near the connection of them is reinforced. Therefore, bending and twisting of the portion near the connection can be avoided to some extent, whereby concentration of stress can be reduced.

Thus, the stress relaxation by the slits 51 in the portion near the site at which the IC chip 30 is mounted and the stress relaxation by the covering 41 in the portion of connection of the IC chip 30 and the antenna part 20 are combined to effectively reduce concentration of stress in the portion of connection of the IC chip 30 and the antenna part 20. Consequently, the possibility of breakage can be reduced.

In the case where two slits 51 are provided on both sides of the IC chip 30, as is the case with the illustrated case, stress can effectively be relaxed particularly in the direction x in FIGS. 1 and 2.

(Exemplary Arrangements of Slits)

While in the illustrative case shown in FIGS. 1 to 3 two slits 51 are provided on both sides of the IC chip 30, the arrangement of slits is not limited to this. Exemplary arrangements of slits will be described with reference to FIG. 4. Because the basic construction other than the arrangement of the slits is the same as that described above, the components same as those shown in FIGS. 1 to 3 will be denoted by the same reference characters and will not be described further.

FIG. 4 includes plan views of exemplary slit arrangement patterns in the IC tags according to embodiments of the present disclosure. FIG. 4 shows the state before molding of the covering.

In the exemplary arrangement shown in FIG. 4(*a*), three slits 52 are provided on both sides of the IC chip 30 and on the side of the IC chip 30 opposite to the portion of connection of the IC chip 30 and the antenna part 20. With this arrangement, stress in the y direction can effectively be relaxed as well as stress in the x direction.

In the exemplary arrangement shown in FIG. 4(*b*), a slit 53 is arranged in such a way as to extend along the periphery of the IC chip 30 except for the portion of connection of the IC chip 30 and the antenna part 20. With this arrangement, stress in directions oblique to the x and y directions can effectively be relaxed as well as stress in the x and y directions.

In the exemplary arrangement shown in FIGS. 4(*c*) and 4(*d*), the exemplary arrangement shown in FIG. 4(*b*) is modified in such a way that the ends of the slit 54, 55 are extended away from the IC chip 30. In the arrangement shown in FIG. 4(*d*), the portions extending away from the IC chip 30 extends in a curved manner. With these arrangements, stress in directions oblique to the x and y directions can effectively be relaxed as well as stress in the x and y directions. Moreover, in the unlikely event that a rent develops from an end of the slit 54, 55, the rent will probably develop on an extension of the slit 54, 55. Then, since the distance from the ends of the slit 54, 55 to the antenna part 20 is larger than that in the arrangement shown in FIG. 4(*b*), the rent will affect less adversely.

(Exemplary Arrangements of the Covering)

The arrangement of the covering is also not limited to that shown in FIGS. 1 to 3. Exemplary arrangements of the covering will be described with reference to FIG. 5. Because the basic construction other than the arrangement of the covering is the same as that described above, the components same as those shown in FIGS. 1 to 3 will be denoted by the same reference characters and will not be described further.

FIG. 5 shows exemplary patterns of arrangement of the covering in the IC tags according to embodiments of the present disclosure.

FIGS. 5(a) and 5(b) show an exemplary arrangement in which a covering 42 is provided (or molded) on the entire area of the side of the film member 10 on which the IC chip 30 is provided. FIG. 5(a) is a plan view of the IC tag 100, and FIG. 5(b) is a cross sectional view taken along line B-B of FIG. 5(a).

FIGS. 5(c) and 5(d) show an exemplary arrangement in which coverings 43 are provided (or molded) on both sides of the film member 10. FIG. 5(c) is a plan view of the IC tag 100, and FIG. 5(d) is a cross sectional view taken along line C-C of FIG. 5(c).

FIGS. 5(e) and 5(f) show an exemplary arrangement in which a covering 44 is provided (or molded) in such a way as to cover only the entire area of the IC chip 30 and the portion of connection of the IC chip 30 and the antenna part 20. In this exemplary arrangement, the covering 44 does not cover the slits 51, unlike with the arrangement shown in FIGS. 1 to 3.

As described above, no limitation is placed on the position of arrangement of the covering on condition that it covers the entire area of the IC chip 30 and the portion of connection of the IC chip 30 and the antenna part 20. The smaller the area over which the covering is provided is, the more the portion near the site at which the IC chip 30 is mounted is apt to deform. In cases where the covering is formed by molding over a region including the slits on one side of the film member 10, as is the case with the arrangements shown in FIGS. 1 to 3 and FIGS. 5(a) and 5(b), the molding material may extend onto the other side of the film member 10 through the slits during the molding process. However, this does not cause particular problems in quality. From the viewpoint of protection of the antenna part 20, the extension of the molding material onto the other side is rather desirable.

The arrangements of the slits shown in FIGS. 1 to 4 and the arrangements of the covering shown in FIGS. 1 to 3 and 5 may be used in desired combinations.

DESCRIPTION OF THE REFERENCE SIGNS

10: film member
20: antenna part
30: IC chip
41, 42, 43, 44: covering
51, 52, 53, 54, 55: slit
51a: hole
100: IC tag

The invention claimed is:

1. An IC tag comprising:
   a film member;
   an antenna part provided on said film member;
   and an IC chip mounted on said film member in such a way as to be connected with the antenna part,
   wherein a slit is provided at a position away from the antenna part in a region on said film member near the site at which the IC chip is mounted, said slit being arranged in such a way as to extend along the periphery of said IC chip except for a portion of connection of said IC chip and said antenna part, and both ends of said slit extending away from said IC chip,
   a covering made of an elastic material is provided to cover at least the entire area of said IC chip and the portion of connection of said IC chip and said antenna part.

2. An IC tag according to claim 1, wherein the portion of said slit extending away from said IC chip extends in a curved manner.

\* \* \* \* \*